(12) United States Patent
Wang et al.

(10) Patent No.: US 10,541,800 B2
(45) Date of Patent: *Jan. 21, 2020

(54) UNIFIED INDEXING FRAMEWORK FOR REFERENCE SIGNALS

(71) Applicant: AT&T Intellectual Property I, L.P., Atlanta, GA (US)

(72) Inventors: Xiaoyi Wang, Austin, TX (US); Arunabha Ghosh, Austin, TX (US); Salam Akoum, Austin, TX (US); Thomas Novlan, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/537,790

(22) Filed: Aug. 12, 2019

(65) Prior Publication Data
US 2019/0363854 A1    Nov. 28, 2019

Related U.S. Application Data

(63) Continuation of application No. 15/699,548, filed on Sep. 8, 2017.

(51) Int. Cl.
    *H04L 5/00*    (2006.01)
(52) U.S. Cl.
    CPC ............ *H04L 5/0051* (2013.01); *H04L 5/001* (2013.01)
(58) Field of Classification Search
    CPC ............................. H04L 5/0051; H04L 5/001
    USPC ........................................................ 370/328
    See application file for complete search history.

(56) References Cited

U.S. PATENT DOCUMENTS

| 9,554,371 | B2 | 1/2017 | Kim et al. |
| 9,572,063 | B2 | 2/2017 | Etemad et al. |
| 9,614,653 | B2 | 4/2017 | Kim et al. |
| 9,712,262 | B2 | 7/2017 | Yi et al. |
| 9,729,273 | B2 | 8/2017 | Khoshnevis et al. |
| 9,736,780 | B2 | 8/2017 | Etemad et al. |
| 9,763,154 | B2 | 9/2017 | Davydov et al. |

(Continued)

OTHER PUBLICATIONS

International Search Report and Written Opinion dated Dec. 17, 2018 for International Application No. PCT/US2018/050108, 13 pages.

(Continued)

*Primary Examiner* — William Nealon
(74) *Attorney, Agent, or Firm* — Amin, Turocy & Watson, LLP

(57) ABSTRACT

Facilitating a signaling framework for configuring different types of reference signals for wireless communication systems is provided herein. A system can comprise: a processor, and a memory that stores executable instructions that, when executed by the processor, facilitate performance of operations. The operations can comprise: receiving a reference signal from a user equipment device; based on the reference signal generating a unique identifier from the reference signal; allocating a resource associated with the reference signal based on a reference signal type and a component carrier index list; associating the unique identifier with the resource, the component carrier index list, and the reference signal type in a data structure; and storing the data structure to the memory and transmitting the data structure to the user equipment device.

20 Claims, 10 Drawing Sheets

(56) References Cited

U.S. PATENT DOCUMENTS

| | | | |
|---|---|---|---|
| 9,768,930 B2 | 9/2017 | Park et al. | |
| 2012/0275393 A1* | 11/2012 | Sorrentino | H04L 5/0048 |
| | | | 370/329 |
| 2013/0094392 A1* | 4/2013 | Kim | H04L 1/0026 |
| | | | 370/252 |
| 2015/0264694 A1* | 9/2015 | Nagata | H04L 25/0224 |
| | | | 370/329 |
| 2016/0223639 A1 | 8/2016 | Davydov et al. | |
| 2016/0301505 A1 | 10/2016 | Furuskog et al. | |
| 2017/0180194 A1 | 6/2017 | Noh et al. | |
| 2017/0265145 A1* | 9/2017 | Benjebbour | H04W 52/24 |
| 2018/0205483 A1* | 7/2018 | Nagaraja | H04B 17/309 |

OTHER PUBLICATIONS

ZTE, "On CSI-RS for beam management", 3GPP Draft; R1-1710194 on CSI-RS for Beam Management, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; 20170627-20170630, Jun. 26, 2017 (Jun. 26, 2017), XP051299418, Retrieved from the Internet: URL:http://www.3gpp.org/ftp Meetings 3GPP Sync/RAN1/Docs/— [retrieved on Jun. 26, 2017] sections 2.2, 2.4, 25.

Catt: "Considerations on beam measurement and reporting", 3GPP Draft; RI-1712376- 3rd Generation Partnership Project (3GPP)- Mobile Competence Centre ; 658; Route Des Lucioles ; F-86921 Sophia-Antipolis Cedex; France; vol. RAN WGI, No. Prague-Czechia; 28178821-28178825 Aug. 28 2817 (2817-88-28), XP851315192; Retrieved from the Internet:URL:http://www.3gpp.org/ftp/Meetings 3GP' SYNC/RANI/Docs/—[retrieved on 2817-88-28] sections 2.3 2.4, 2.6.

Non-Final Office Action received for U.S. Appl. No. 15/699,548 dated Dec. 26, 2018, 20 pages.

* cited by examiner

US 10,541,800 B2

UNIFIED INDEXING FRAMEWORK FOR REFERENCE SIGNALS

RELATED APPLICATION

The subject patent application is a continuation of, and claims priority to, U.S. patent application Ser. No. 15/699,548, filed Sep. 8, 2017 and entitled "UNIFIED INDEXING FRAMEWORK FOR REFERENCE SIGNALS," the entirety of which application is hereby incorporated by reference herein.

TECHNICAL FIELD

The subject disclosure relates generally to wireless communication systems in general, and to fifth-generation cellular wireless communications systems in particular to the signaling framework for configuring different types of reference signals.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
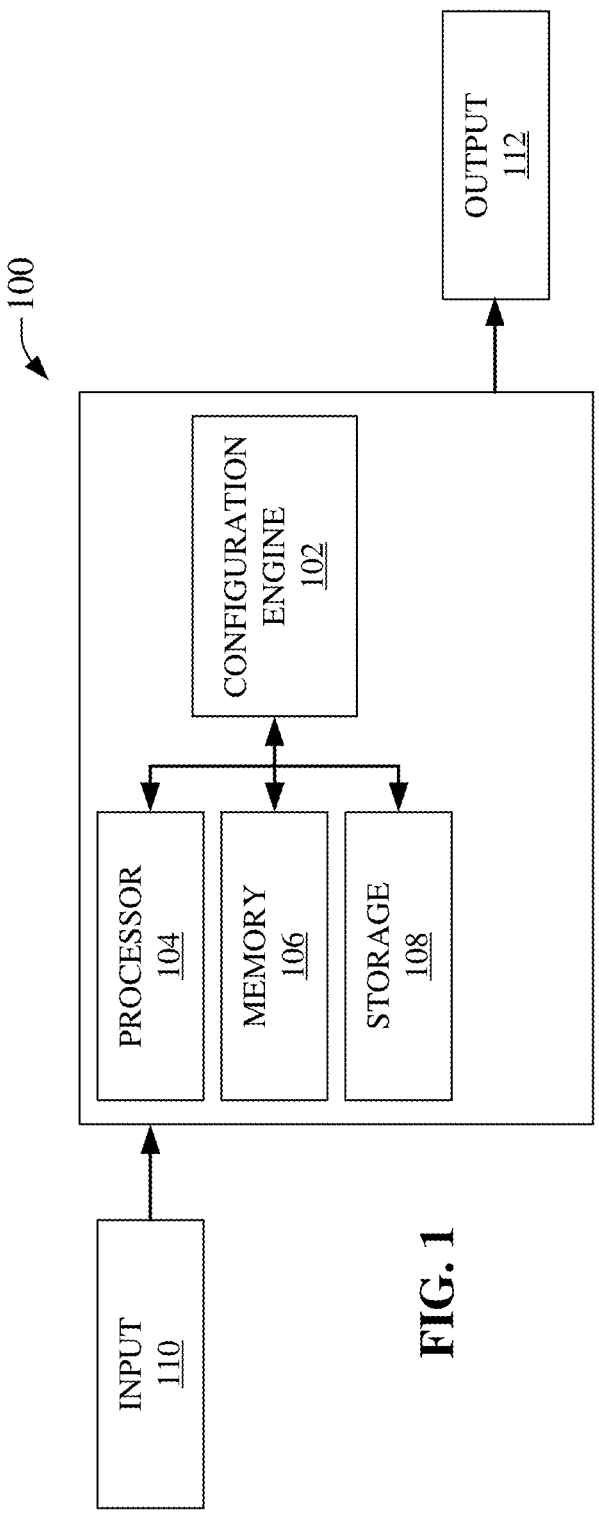
FIG. 1 illustrates an example, non-limiting system for configuring different types of reference signals.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

The most important design in the Long Term Evolution (LTE) 5th Generation (5G) New Radio (NR) cellular system is removal of the Common Reference Signal (CRS). As a replacement, many of the CRS based functions now are based on user equipment (UE) specific Reference Signals, thus the transmissions can be on an as-needed basis. As a result, several new Reference Signal types have been introduced in NR. For instance, a phase tracking reference signal (PT-RS) that tracks a phase offset, and a time and frequency reference signal (TRS) that tracks time and frequencies, have been introduced. Further, a channel state information reference signal (CSI-RS) can now be used for multiple purposes, for example, for mobility, beam management, and/or channel state information (CSI) acquisition.

Prior versions of the Long Term Evolution (LTE) (e.g., the fourth generation (4G) of the LTE), was designed such that reference signal configuration was typically based on type. In radio resource control (RRC) signaling, for example, the network firstly configured a list of CSI-RS resource each with an index value. Subsequently, the network just needed to use the index value to configure the CSI-RS used by certain function. For instance, in a physical downlink shared channel (PDSCH) rate matching and quasi-co-location indicator (PQI) state configuration, the base station device (e.g., eNB device) could simply indicate a CSI-RS index value=2 to be used in this state for purposes of quasi-co-location (QCL) and physical downlink shared channel resource element (PDSCH RE) mapping.

While the foregoing is a simple and efficient solution, it is not designed to handle a system with a multitude of disparate RS types. In the NR context, a data structure, such as an index table, is required to be constructed and maintained for each type of RS. Then, during function association and/or configuration, further signaling can be necessary to indicate the type of RS because some functionality can be based on different RS types. For example, beam management and beam recovery procedures can be based on a synchronization signal block (SS-block) and/or a channel state information reference signal (CSI-RS).

In addition, design of the NR cellular system has introduced a cross-component carrier quasi-co-location assumption that allows user equipment (UE) devices to utilize synchronization obtained from a first component carrier in the demodulation and/or channel management on another disparate second component carrier. Traditional RS indexing in LTE is based on component carrier (CC), which can add another dimension in signaling design. For instance, when configuring cross-CC QCL, the signaling needs to indicate which RS in which CC is QCLed in combination with the type of RS.

The following exposition describes and discloses systems and methods that provide improved and/or enhanced signaling frameworks that support unified RS resource configurations with unique identifiers to support configuration of diverse and disparate types of RS. The described improved and/or enhanced signaling framework supports configuring QCL between the RS on different and diverse component carriers. Further, the disclosed improved and/or enhanced signaling framework supports configuring QCL between the RS on disparate directions (e.g., uplink and downlink). Additionally, the described improved and/or enhanced signaling framework supports configuring QCL between the RS on different time periodicities. Furthermore, the disclosed and described improved and/or enhanced signaling framework supports configuring QCL between the different RS on different measurements.

Turning to the figures, FIG. 1 provides illustration of a system 100 for configuring different types of reference signals, in accordance with an embodiment. System 100 can be any wireless radio device that for purposes of illustration, can be any type of mechanism, machine, device, facility, apparatus, and/or instrument/instrumentality that includes a processor and/or is capable of effective and/or operative communication with a wired and/or wireless network topology. System 100 can be a network device of a plurality of network devices that can form a multicarrier wireless network infrastructure. Mechanisms, machines, apparatuses, devices, facilities, and/or instruments/instrumentalities that can comprise system 100 can include tablet computing devices, handheld devices, server class computing devices, machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, consumer and/or industrial appliances and/or instrumentation associated with automotive vehicles, industrial and/or consumer appliances and/or instrumentation associated with aerospace vehicles and/or satellites orbiting in low earth orbit, geosynchronous orbit, and the like.

As depicted, system 100 can comprise configuration engine 102 that can be in operative communication with processor 104, memory 106, and/or storage 108. Configuration engine 102 can be in communication with processor 104 for facilitating operation of computer-executable instructions or machine-executable instructions and/or components by configuration engine 102, memory 106 for storing data and/or computer-executable instructions and/or machine-executable instructions and/or components, and/or storage 508 for providing longer term storage of data and/or machine-readable constructions and/or computer-readable instructions. Additionally, system 100 can also receive input 110 for use, manipulation, and/or transformation by configuration engine 102 to produce one or more useful, concrete, and tangible results, and/or transform one or more articles to different states or things. Further, system 100 can also generate and output the useful, concrete, and tangible results and/or the transformed one or more articles generated by configuration engine 102 (and/or generated or facilitated by other associated and/or additional disparate engines and/or components) as output 112.

In accordance with an embodiment system 100, can receive, as input 110, reference signal values from a user equipment device (not shown) with which system 100 can be in communication. The reference signal (RS) values can relate to and be associated with a synchronization signal block (SS-block) values, channel state information reference signal (CSI-RS) values, sounding reference signal (SRS) values, demodulation reference signal in uplink transmission (DMRS) values, total radiated sensitivity (TRS) values, phase-tracking reference signal (PT-RS) values, and the like. On receiving and in response to receiving the RS value, configuration engine 102, as a function of the received RS value, a RS type, a cell identifier value (and/or cell sector identifier address) associated with system 100, an identifier value associated with the user equipment device (e.g., international mobile subscriber identity (IMSI), media access control (MAC) address or ethernet hardware address (EHA)), base station device (e.g., next-generation NodeB (gNB), evolved NodeB (eNodeB), . . . ) unique identifier, etc., can generate a unique identifier to be associated with the RS.

Configuration engine 102 can thereafter, based on, or as a function of, a RS type and a CC index list can allocate resources to be associated with the RS. Resource allocation performed, or facilitated, by configuration engine 102 can be determined based on: RS types, subcarrier values, orthogonal frequency division multiplexing (OFDM) symbol resource values, bandwidth (including bandwidth part configuration) values, frequency offset values from an absolute radiofrequency channel number (ARFCN) center frequency value, frequency offset values from a bandwidth part (BWP) center frequency value, sub-frame offset values, sub-frame periodicity values, a value indicating a number of ports, and the like.

Configuration engine 102, having performed, or facilitated, resource allocation, can associate the previously generated unique identifier with the resource allocation, a component carrier index list, and a reference signal type in a data structure. Example data structures that can be employed as data structures can include arrays, lists, doubly linked lists, array lists, linked lists, self organizing lists, binary trees, randomized binary search trees, self balancing binary search trees, heaps, binary heaps, hash tables, hash trees, directed graphs, adjacency matrixes, adjacency lists, hypergraphs, and the like. Configuration engine 102 can then store the data structure to memory and can also transmit the data structure back to the invoking or initiating user equipment device.

In the context of the foregoing (invoking) user equipment device, this device can be any type of mechanism, machine, device, facility, apparatus, and/or instrument or instrumentality that includes a processor and/or is capable of effective and/or operative communication with a wired and/or wireless network topology. Illustrative mechanisms, machines, apparatus, devices, facilities, and/or instruments/instrumentalities that can comprise user equipment device can include tablet computing devices, handheld devices, server class computing devices, machines, and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, consumer and/or industrial devices and/or instrumentation associated with automotive vehicles, industrial and/or consumer appliances and/or instrumentation associated with aerospace vehicles and/or satellites orbiting in low earth orbit geo-stationary orbit, and the like.

It will be further noted, in the context of RS received from the invoking user equipment device, system 100 (and more specifically configuration engine 102) generates an individuated unique identifier for the RS, wherein the individuated unique identifier is based on the received RS, the RS type, a cell identifier associated with system 100, an identifier associated with the invoking user equipment device, etc. In generating the individuated unique identifier, configuration engine 102 can also employ one or more crypto analytical techniques to ensure uniqueness of the identifier. Additionally, configuration engine 102 can also employ aspects of a blockchain technology (e.g., a cryptographically secured chain of blocks) for purposes of ensuring uniqueness, security, and for use as a data structure paradigm.

Figure 2:
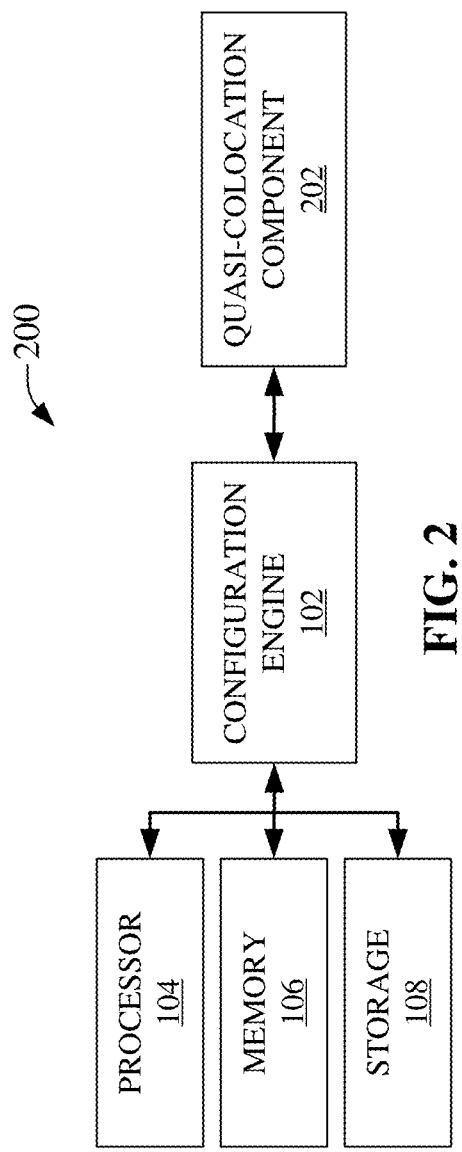
FIG. 2 illustrates an example, non-limiting example system for configuring different types of reference signals in accordance with one or more embodiments described herein.

FIG. 2 provides further depiction of system 100, now identified as system 200, for configuring different types of reference signals, in accordance with an embodiment. As illustrated, system 200 includes quasi colocation component 202 that in collaboration with configuration engine 102, processor 104, memory 106, and/or storage 108 provides configuration for different types of reference signals. Quasi-colocation component 202, based on individuated unique identifier for RS (e.g., the individuated unique identifier previously generated by configuration engine 102), and as a function of each individuated unique identifier for each reference signal, can provide basic signaling indication for each RS. Further, quasi-colocation component 202, based on individuated unique identifier for each RS, can support QCL configuration across multiple disparate component carriers (e.g., RS resources from different, diverse, component carriers (CCs)). Additionally, quasi-colocation component 202, based on individuated unique identifier for RS, can support QCL configuration between different diverse types of RS (e.g., RS resources with different types). Furthermore, quasi-colocation component 202, based on individuated unique identifier for RS, can support QCL configuration between the RS resource of downlink and uplink e.g., sounding reference signals (SRS) and channel state information reference signal (CSI-RS).

Figure 3:
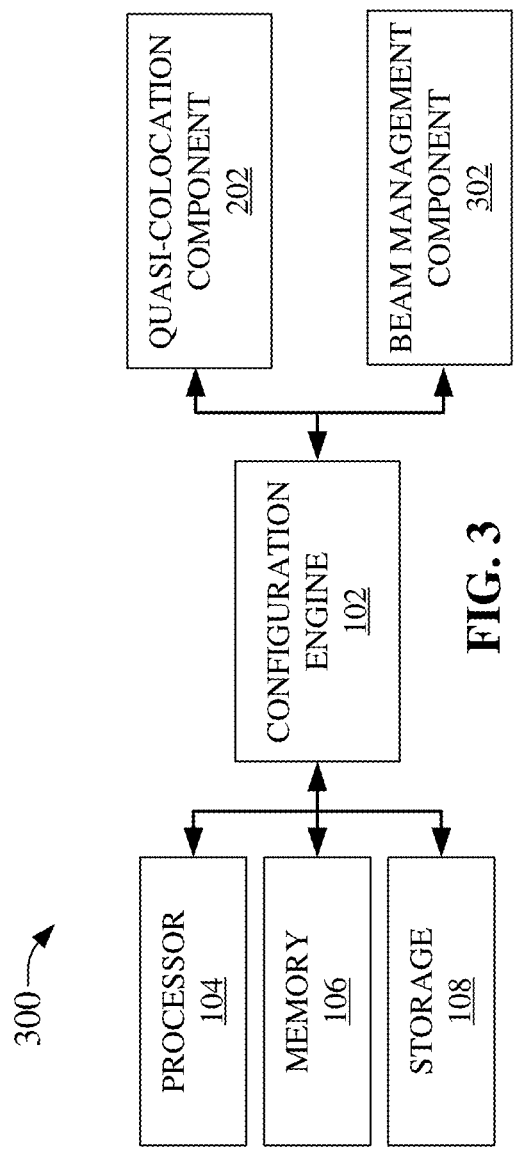
FIG. 3 illustrates an example, non-limiting example system for configuring different types of reference signals in accordance with one or more embodiments described herein.

FIG. 3 provides a further illustration of system 100, now identified as system 300, for configuring different types of reference signals, in accordance with an embodiment. As illustrated, system 300 can include beam management component 302 that in collaboration with quasi-colocation component 202, configuration engine 102, processor 104, memory 106, and/or storage 108 can provide configuration for different types of reference signals. Beam management component 302, based on individuated unique identifier for RS (e.g., the individuated unique identifier previously generated by configuration engine 102), and as a function of each individuated unique identifier for each reference signal, can provide reference symbol received power (RSRP) measurement values and reporting configuration values that includes an individuated unique identifier which can indicate the type of RS for measurement. For instance, synchronization signal block (SS-block) based RSRP and/or CSI-RS based RSRP can be supported by the same signaling framework.

Figure 4:
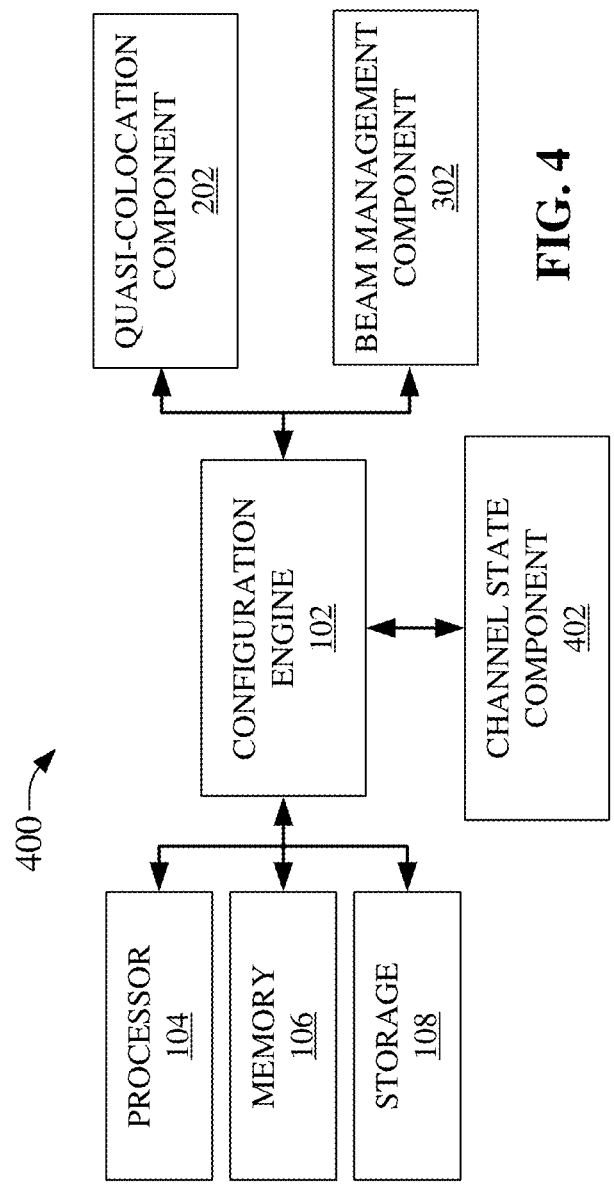
FIG. 4 illustrates an example, non-limiting example system for configuring different types of reference signals in accordance with one or more embodiments described herein.

FIG. 4 provides additional illustration of system 100, now identified as system 400, for configuring different types of reference signals, in accordance with an embodiment. As illustrated, system 400 can include channel state component 402 that in conjunction with beam management component 302, quasi-colocation component 202, configuration engine 102, processor 104, memory 106, and/or storage 108 can provide and facilitate configuration of different types of reference signals. Channel state component 402, based on individuated unique identifier for RS (e.g., the individuated unique identifier previously generated by configuration engine 102), and as a function of each individuated unique identifier for each reference signal, can support aperiodic CSI-RS, periodic CSI-RS, and semi-persistent CSI-RS. In accordance with an embodiment, channel state component 402, for downlink control information (DCI) based triggering, can configure RS resources as a function of each individuated unique identifier for each DCI triggering state, in which case, the periodicity information is typically overwritten by the triggering timing for aperiodic CSI-RS.

In accordance with an additional embodiment, channel state component 402, for semi-persistent triggering, can configure a group of RS resources as a function of each of the individuated unique identifiers associated with the group of RS resources, and then can use a medium access control common element (MAC-CE) to activate or deactivate the group of RS resources. In this case, the periodicity and sub-frame offset is used with the activation duration determined by the MAC-CE.

In a further embodiment, channel state component 402, for periodic triggering, can configure RS resources in radio resource control (RRC) signaling as a function of each individuated unique identifier of the RS resources comprising RRC signaling, and then the CSI-RS transmission follows the periodicity and sub-frame offset defined in each RS resource.

Figure 5:
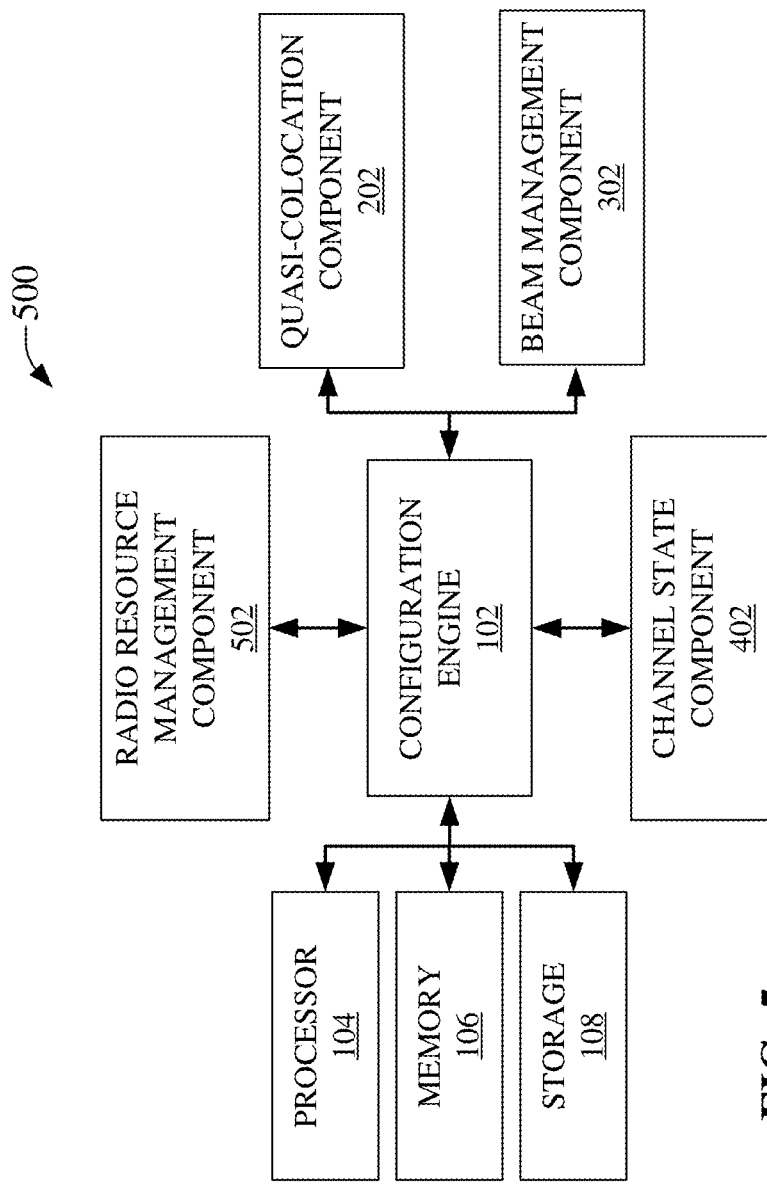
FIG. 5 illustrates an example, non-limiting example system for configuring different types of reference signals in accordance with one or more embodiments described herein.

FIG. 5 provides further illustration of system 100, now identified as system 500, for configuring different types of reference signals, in accordance with an embodiment. System 500 can include radio resource management component 502 that in cooperation with channel state component 402, beam management component 402, quasi-colocation component 202, configuration engine 102, processor 104, memory 106, and/or storage 108 can facilitate configuration of different types of reference signals. In accordance with an embodiment, when a user equipment device is configured with multiple RS types for radio resource management (RRM) measurement on a given CC or BWP, when reporting a measurement value associated with each of multiple RS types, the user equipment device can indicate the RS(s) utilized for a given measurement along with the corresponding unique identifier for RS (e.g., the individuated unique identifier previously generated by configuration engine 102 and transmitted to the user equipment device and included in a data structure). Radio resource management component 502 therefore can receive, from communicating user equipment devices, measurement values associated with each type of RS as part of a measurement object. Additional measurement values that can comprise the measurement object can include other associated higher layer (e.g., radio resource control (RRC)) indicated measurements and reporting configurations.

In an additional embodiment, when configuring intra- or inter-frequency measurements for a given user equipment device, a unique identifier (e.g., the individuated unique identifier previously generated by configuration engine 102 and transmitted to the user equipment device and included in a data structure) can be received by radio resource management component 502. The unique identifier can indicate a link to a common RS configuration which can be used for multiple purposes, such as, CSI-RS can be used for beam management, CSI acquisition, and/or LTE Layer 3 (L3) mobility.

Figure 6:
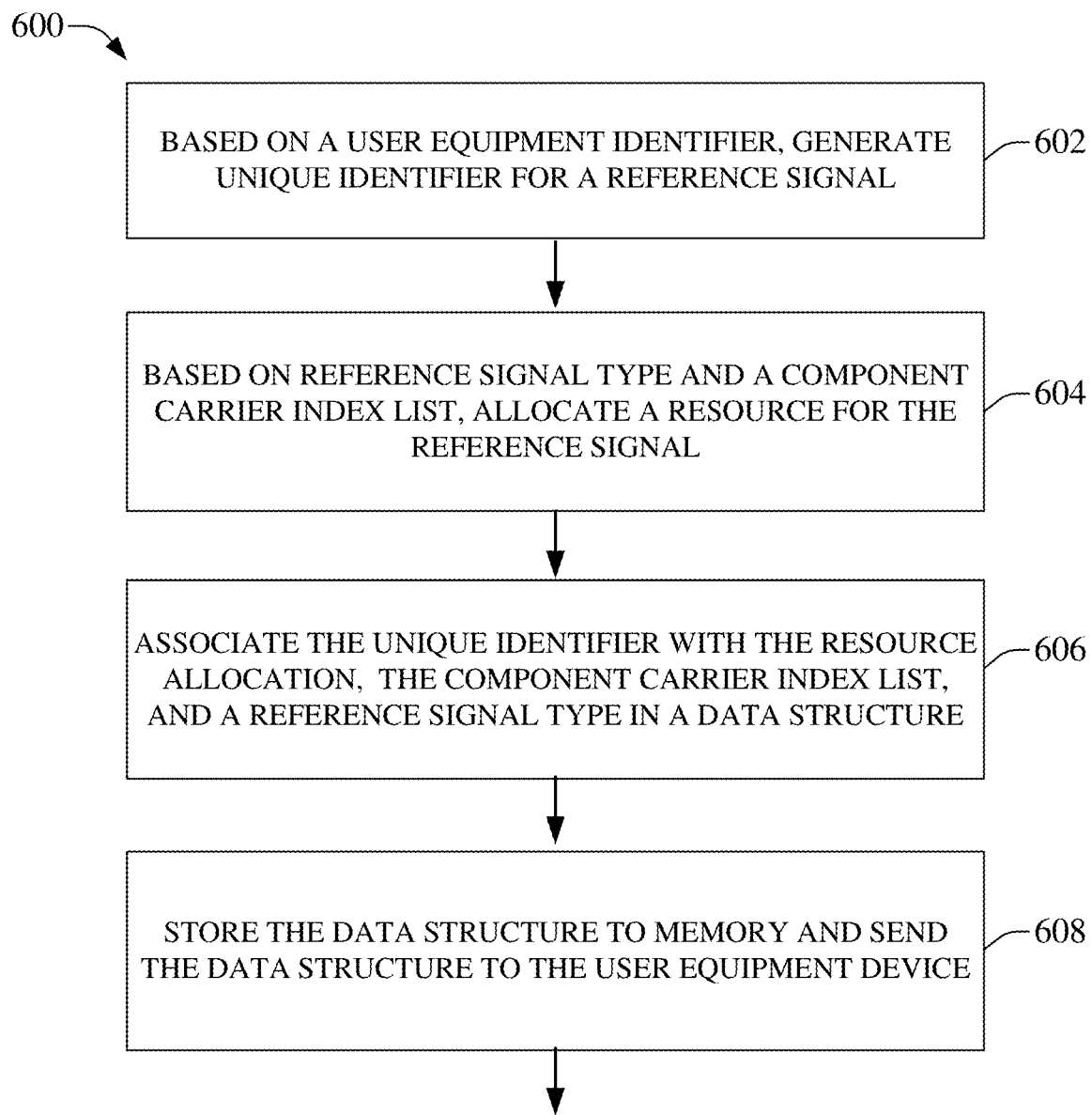
FIG. 6 illustrates a high-level example, non-limiting method for configuring different types of reference signals in accordance with one or more embodiments described herein.

FIG. 6 illustrates a method 600 for configuring different types of reference signals, in accordance with an embodiment. Method 600 can be implemented on the base station device, such as system 100, whereupon at 602 system 100, as a function of a received RS value, a RS type, a cell identifier value (and/or cell sector identifier address) associated with system 100, an identifier value associated with a user equipment device (e.g., international mobile subscriber identity (IMSI), media access control (MAC) address or ethernet hardware address (EHA)), base station device (e.g., next-generation NodeB (gNB), evolved NodeB (eNodeB), . . . ) unique identifier, etc., can generate a unique identifier to be associated with the RS. At 604 based on, or as a function of, a RS type and a CC index list, resources can be allocate and associated with the RS. Resource allocation can be determined based on: RS types, subcarrier values, orthogonal frequency division multiplexing (OFDM) symbol resource values, bandwidth (including bandwidth part configuration) values, frequency offset values from an absolute radiofrequency channel number (ARFCN) center frequency value, frequency offset values from a bandwidth part (BWP) center frequency value, sub-frame offset values, sub-frame periodicity values, a value indicating a number of ports, etc. At 606 the previously generated unique identifier can be associated with the resource allocation, a component carrier index list, and a reference signal type and placed in an appropriate data structure. At 608 the data structure can be persisted to memory and can also be transmitted to a user equipment device.

Figure 7:
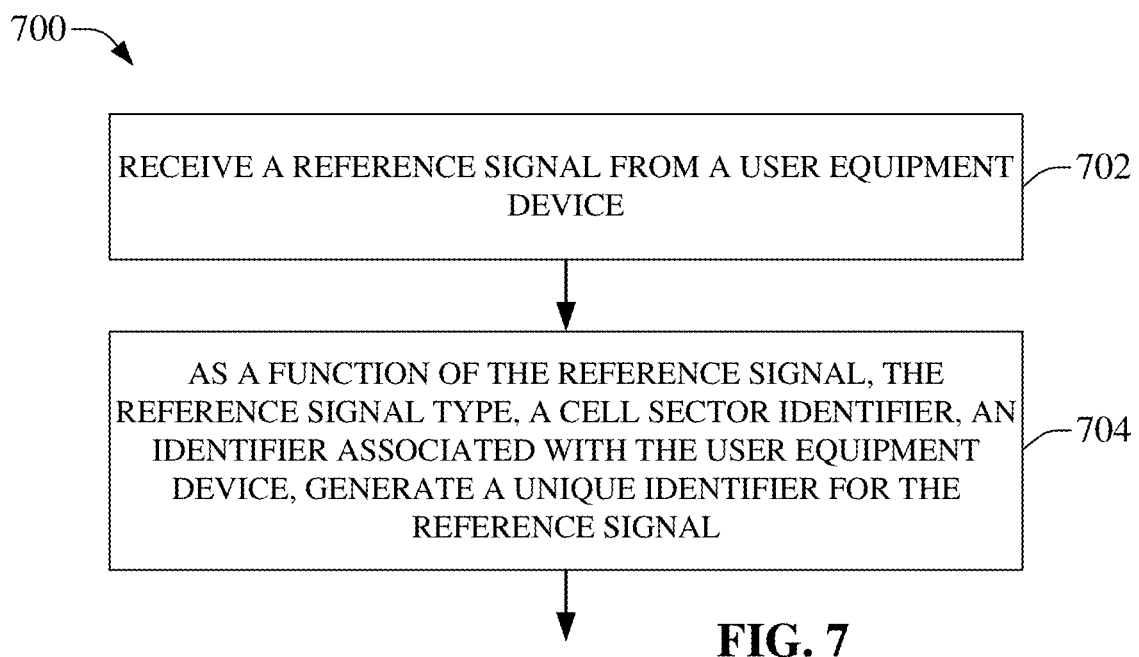
FIG. 7 illustrates an example, non-limiting method for configuring different types of reference signals in accordance with one or more embodiments described herein.

FIG. 7 illustrates a method 700 for configuring different types of reference signals, in accordance with an embodiment. Method 700 can commence at 702 where a reference signal (RS) from a user equipment device can be received. At 704, as a function of the received RS value, a RS type, a cell identifier value and/or cell sector identifier address, an identifier value associated with the user equipment device, such as: international mobile subscriber identity (IMSI), media access control (MAC) address, or ethernet hardware address (EHA), or base station device unique identifier, can generate a unique identifier to be associated with the RS. The unique identifier can then be associated into an appropriate data structure with a generated resource allocation, a component carrier index list, and reference signal type, after which the data structure can be stored to memory (e.g., memory 106 and/or storage 108) or a database device of plurality of database devices. The data structure can also be transmitted to a user equipment device, whereupon the user equipment device can store the data structure to memories associated with the user equipment device.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as New Radio (NR) access. Accordingly, systems, methods, and/or machine-readable storage media for facilitating management of group common downlink control channels for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

In a described embodiment, a system can comprise a processor and a memory that stores machine-executable instructions and/or computer-executable instructions that, when executed by the processor, facilitate performance of operations. The operations can comprise receiving, from a network device of network devices, downlink transmission data comprising downlink control information applicable to a downlink channel of the network device; as a function of the downlink transmission data, adjusting a subband of subbands resulting in an aggregation of multiple subbands; and transmitting uplink radio traffic data via the aggregation of multiple subbands to the network device.

The downlink transmission data can further comprise physical downlink shared channel data; reference signal for channel state information acquisition data applicable to the downlink channel of the network device; and radio resource management data applicable to the downlink channel of the network device.

Additional operations can comprise receiving the downlink transmission data in a first subband of the subband of subbands; in response to the network device using an orthogonal frequency division multiplexing encoding scheme, receiving a first orthogonal frequency division multiplexing symbol representing the downlink control information (DCI) data in a first subband of the subband of subbands; and receiving a second orthogonal frequency division multiplexing symbol subsequent to the first orthogonal frequency division multiplexing symbol, and wherein the second orthogonal frequency division multiplexing symbol comprises physical downlink shared channel data.

In further described embodiment, a method that can comprise receiving, by a system comprising a processor, downlink transmission data comprising downlink control information applicable to a downlink channel of a network device of network devices; as a function of the downlink transmission data, adjusting, by the system, a subband of subbands resulting in an aggregation of multiple subbands; and transmitting, by the system, uplink radio traffic data via the aggregation of multiple subbands to the network device.

The downlink transmission data can further comprise physical downlink shared channel data; reference signal for channel state information acquisition data applicable to the downlink channel of the network device; and/or radio resource management data applicable to the downlink channel of the network device.

Further acts that can be performed by the method comprise receiving the downlink transmission data in a first subband of the subband of subbands; in response to the network device using an orthogonal frequency division multiplexing encoding scheme, receiving, by the system, a first orthogonal frequency division multiplexing symbol representing the downlink control information (DCI) data in a first subband of the subband of subbands; and receiving, by the system, a second orthogonal frequency division multiplexing symbol subsequent to the first orthogonal frequency division multiplexing symbol, and wherein the second orthogonal frequency division multiplexing symbol comprises physical downlink shared channel data.

In another embodiment, a machine-readable storage medium, comprising executable instructions that, when executed by a processor, facilitate performance of operations, is described. The operations can comprise: receiving, from a network device of network devices, downlink transmission data comprising downlink control information applicable to a downlink channel of the network device; as a function of the downlink transmission data, adjusting a subband of subbands resulting in an aggregation of multiple subbands; and transmitting uplink radio traffic data via the aggregation of multiple subbands to the network device.

The downlink transmission data can further comprise physical downlink shared channel data; reference signal for channel state information acquisition data applicable to the downlink channel of the network device; and/or radio resource management data applicable to the downlink channel of the network device.

Additional operations can comprise receiving the downlink transmission data in a first subband of the subband of subbands; in response to the network device using an orthogonal frequency division multiplexing encoding scheme, receiving a first orthogonal frequency division multiplexing symbol representing the downlink control information (DCI) data in a first subband of the subband of subbands; and receiving a second orthogonal frequency division multiplexing symbol subsequent to the first orthogonal frequency division multiplexing symbol, and wherein the second orthogonal frequency division multiplexing symbol comprises physical downlink shared channel data.

Further described are systems, methods, articles of manufacture, and other embodiments or implementations that can facilitate virtual carrier aggregation for wideband operation of wireless communication systems in a 5G network. Facilitating of virtual carrier aggregation for wideband operation of wireless communication systems in a 5G network can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access, 5G networks can comprise the following: data rates of several tens of megabits per second supported for tens of thousands of users; 1 gigabit per second can be offered simultaneously (or concurrently) to tens of workers on the same office floor, several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 8:
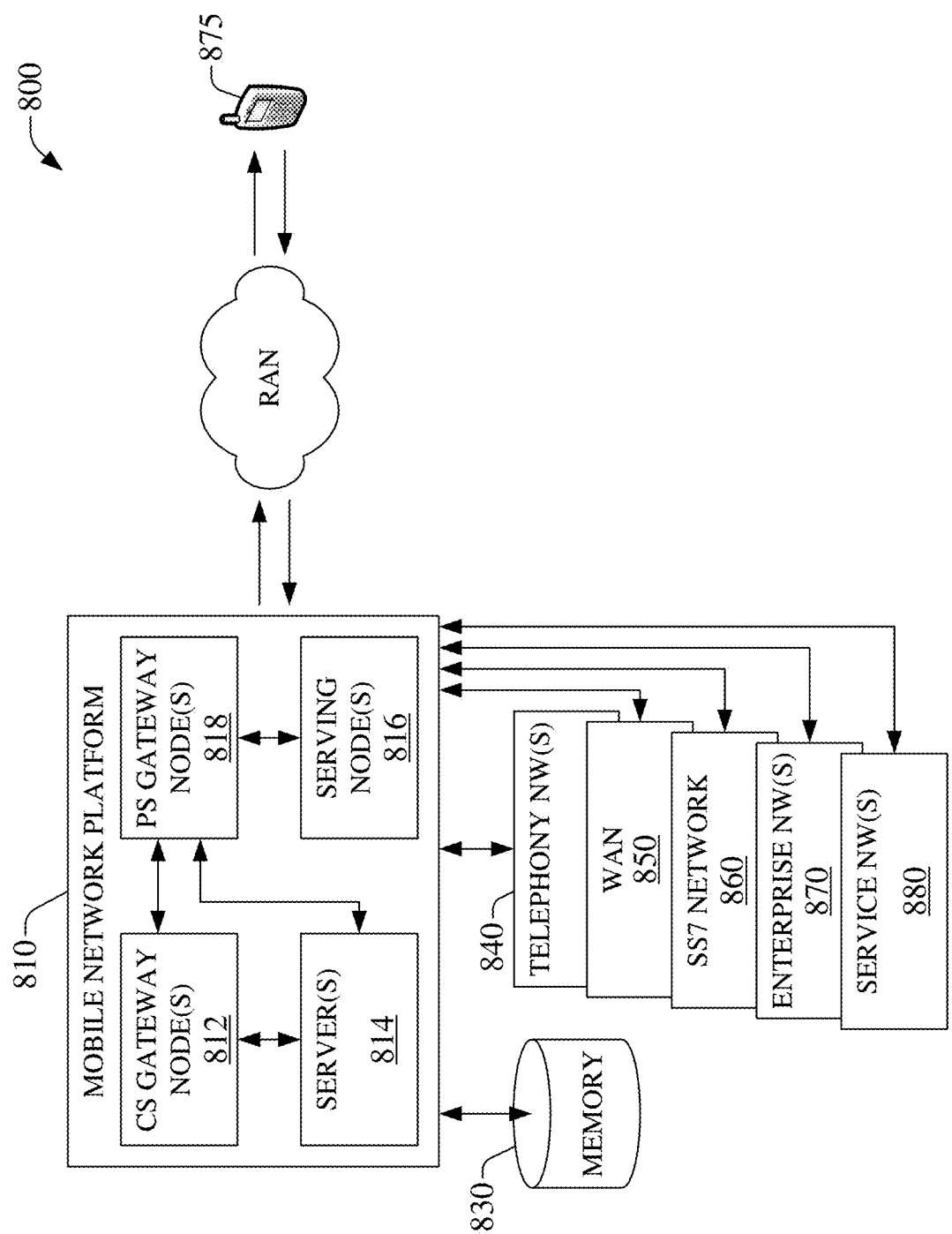
FIG. 8 is a block diagram of an example embodiment of a mobile network platform to implement and exploit various features or aspects of the subject disclosure.

FIG. 8 presents an example embodiment 800 of a mobile network platform 810 that can implement and exploit one or more aspects of the disclosed subject matter described herein. Generally, wireless network platform 810 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 810 can be included in telecommunications carrier networks, and can be considered carrier-side components as discussed elsewhere herein. Mobile network platform 810 includes CS gateway node(s) 812 which can interface CS traffic received from legacy networks like telephony network(s) 840 (e.g., public switched telephone network (PSTN), or public land mobile network (PLMN)) or a signaling system #7 (SS7) network 870. Circuit switched gateway node(s) 812 can authorize and authenticate traffic (e.g., voice) arising from such networks. Additionally, CS gateway node(s) 812 can access mobility, or roaming, data generated through SS7 network 870; for instance, mobility data stored in a visited location register (VLR), which can reside in memory 830. Moreover, CS gateway node(s) 812 interfaces CS-based traffic and signaling and PS gateway node(s) 818. As an example, in a 3GPP UMTS network, CS gateway node(s) 812 can be realized at least in part in gateway GPRS support node(s) (GGSN). It should be appreciated that functionality and specific operation of CS gateway node(s) 812, PS gateway node(s) 818, and serving node(s) 816, is provided and dictated by radio technology(ies) utilized by mobile network platform 810 for telecommunication.

In addition to receiving and processing CS-switched traffic and signaling, PS gateway node(s) 818 can authorize and authenticate PS-based data sessions with served mobile devices. Data sessions can include traffic, or content(s), exchanged with networks external to the wireless network platform 810, like wide area network(s) (WANs) 850, enterprise network(s) 870, and service network(s) 880, which can be embodied in local area network(s) (LANs), can also be interfaced with mobile network platform 810 through PS gateway node(s) 818. It is to be noted that WANs 850 and enterprise network(s) 860 can embody, at least in part, a service network(s) like IP multimedia subsystem (IMS). Based on radio technology layer(s) available in technology resource(s) 817, packet-switched gateway node(s) 818 can generate packet data protocol contexts when a data session is established; other data structures that facilitate routing of packetized data also can be generated. To that end, in an aspect, PS gateway node(s) 818 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 800, wireless network platform 810 also includes serving node(s) 816 that, based upon available radio technology layer(s) within technology resource(s) 817, convey the various packetized flows of data streams received through PS gateway node(s) 818. It is to be noted that for technology resource(s) 817 that rely primarily on CS communication, server node(s) can deliver traffic without reliance on PS gateway node(s) 818; for example, server node(s) can embody at least in part a mobile switching center. As an example, in a 3GPP UMTS network, serving node(s) 816 can be embodied in serving GPRS support node(s) (SGSN).

For radio technologies that exploit packetized communication, server(s) 814 in wireless network platform 810 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 810. Data streams (e.g., content(s) that are part of a voice call or data session) can be conveyed to PS gateway node(s) 818 for authorization/authentication and initiation of a data session, and to serving node(s) 816 for communication thereafter. In addition to application server, server(s) 814 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 810 to ensure network's operation and data integrity in addition to authorization and authentication procedures that CS gateway node(s) 812 and PS gateway node(s) 818 can enact. Moreover, provisioning server(s) can provision services from external network(s) like networks operated by a disparate service provider; for instance, WAN 850 or Global Positioning System (GPS) network(s) (not shown). Provisioning server(s) can also provision coverage through networks associated to wireless network platform 810 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 875.

It is to be noted that server(s) 814 can include one or more processors configured to confer at least in part the functionality of macro network platform 810. To that end, the one or more processor can execute code instructions stored in memory 830, for example. It is should be appreciated that server(s) 814 can include a content manager 815, which operates in substantially the same manner as described hereinbefore.

In example embodiment 800, memory 830 can store information related to operation of wireless network platform 810. Other operational information can include provisioning information of mobile devices served through wireless platform network 810, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 830 can also store information from at least one of telephony network(s) 840, WAN 850, enterprise network(s) 860, or SS7 network 870. In an aspect, memory 830 can be, for example, accessed as part of a data store component or as a remotely connected memory store.

Figure 9:
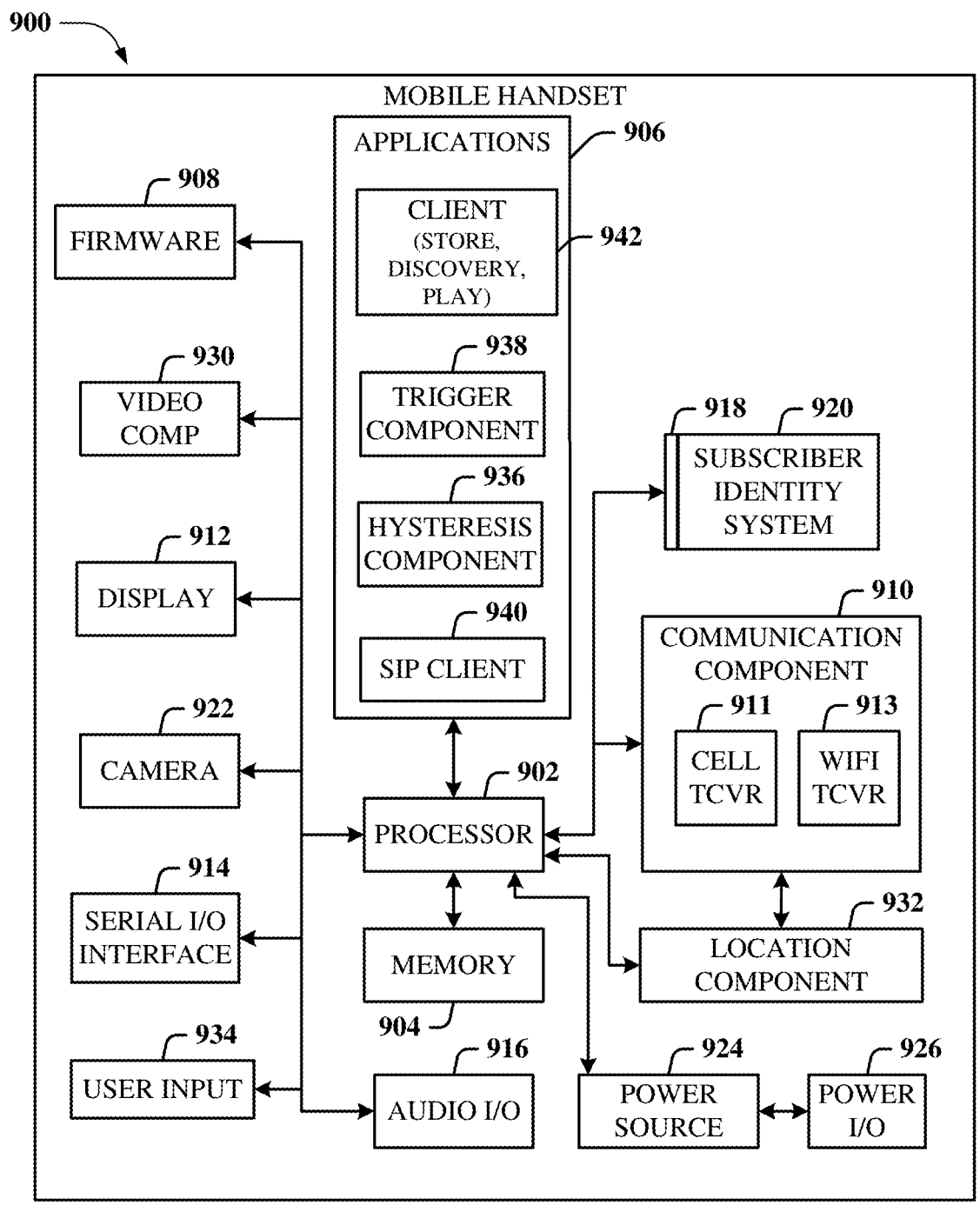
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
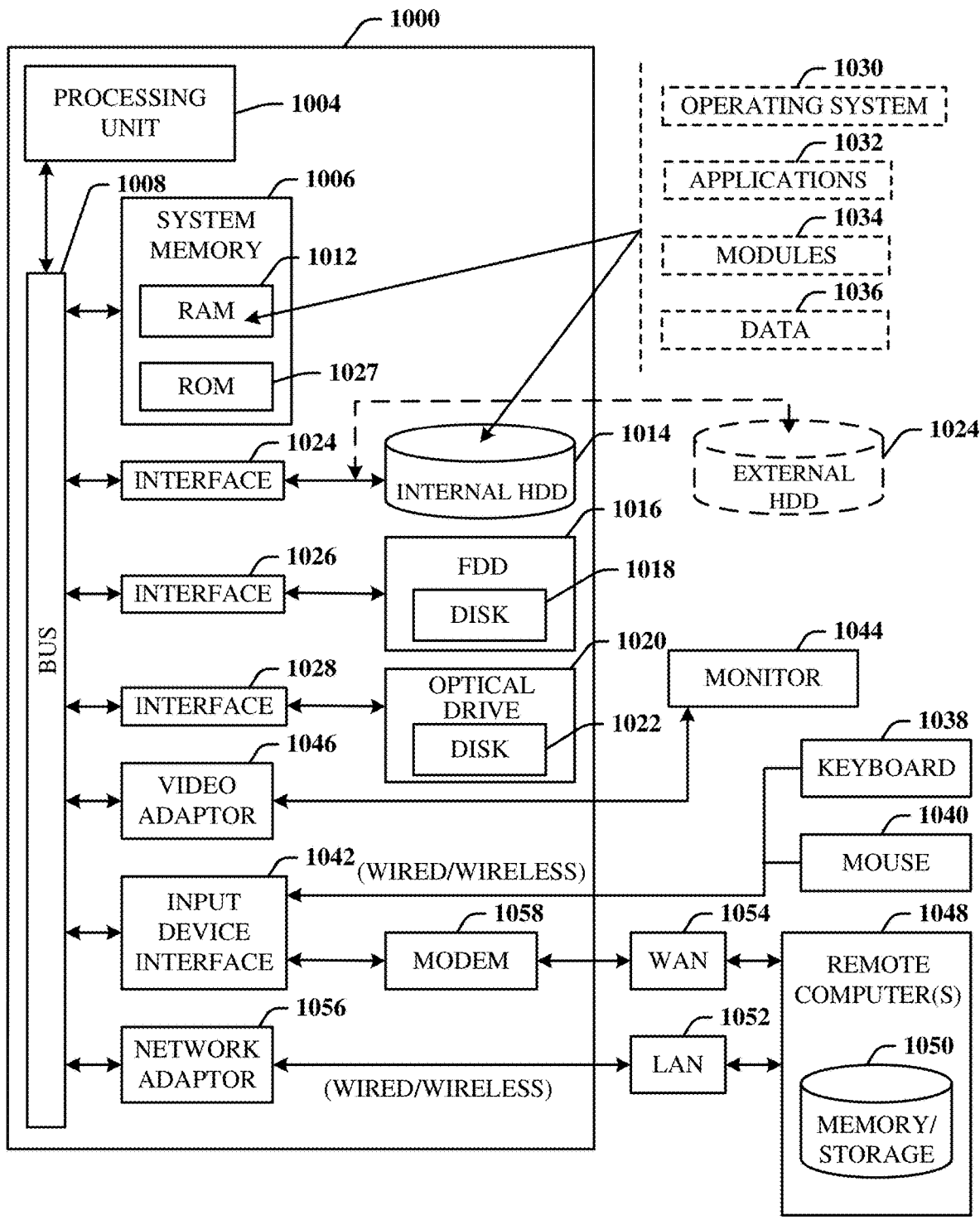
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 10 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not taken into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device, comprising:
    a processor, and
    a memory that stores executable instructions that, when executed by the processor, facilitate performance of operations, comprising:
        as a function of a first identifier associated with the device, a reference signal type, and a second identifier associated with a mobile device, generating a unique identifier associated with a reference signal resource;
        allocating the reference signal resource with the reference signal type and a group of index data representative of a component carrier, and
        facilitating the mobile device to measure a reference signal of the reference signal type associated with the unique identifier.

2. The device of claim 1, wherein the operations further comprise adapting the reference signal resource for use by the mobile device.

3. The device of claim 1, wherein the operations further comprise transmitting the reference signal to the mobile device.

4. The device of claim 1, wherein the facilitating the mobile device to measure the reference signal comprises facilitating the mobile device to use a quasi-colocation assumption as input to measurement of the reference signal.

5. The device of claim 1, wherein the operations further comprise facilitating the mobile device to use a reference symbol received power measurement value for beam management.

6. The device of claim 1, wherein the operations further comprise facilitating the mobile device to use a reference symbol received power measurement value for mobility management.

7. A method, comprising:
    based on a first identifier associated with an apparatus comprising a processor, a reference signal type, and a second identifier associated with a portable device, generating, by the apparatus, a unique identifier associated with a reference signal resource;
    allocating, by the apparatus, the reference signal resource with the reference signal type and index data representing a component carrier; and
    transmitting, by the apparatus, a reference signal of the reference signal type to the portable device.

8. The method of claim 7, further comprising configuring, by the apparatus, the reference signal resource for use by the portable device.

9. The method of claim 7, further comprising facilitating, by the apparatus, the portable device to measure the reference signal associated with the unique identifier.

10. The method of claim 7, further comprising facilitating, by the apparatus, the portable device to use a quasi-colocation assumption for measurement of the reference signal.

11. The method of claim 7, further comprising facilitating, by the apparatus, the portable device to use a reference symbol received power measurement value for beam management.

12. The method of claim 7, further comprising facilitating, by the apparatus, the portable device to use a reference symbol received power measurement value for mobility management.

13. The method of claim 7, wherein the reference signal resource comprises a channel state information reference signal.

14. The method of claim 7, wherein the reference signal resource comprises a phase-tracking reference signal.

15. The method of claim 7, wherein the reference signal resource comprises a demodulation reference signal in an uplink transmission.

16. The method of claim 7, wherein the reference signal resource comprises a demodulation reference signal in a downlink transmission.

17. A non-transitory machine-readable medium, comprising executable instructions that, when executed by a processor, facilitate performance of operations, comprising:
    generating a unique identifier associated with a reference signal resource, wherein the unique identifier is generated as a function of a first identifier associated with the processor, a reference signal type, and a second identifier associated with a device;
    allocating the reference signal resource with a type of reference signal and a list of index data representative of a component carrier;
    transmitting the reference signal to the device; and
    facilitating the device to measure the reference signal associated with the unique identifier.

18. The non-transitory machine-readable medium of claim 17, wherein the operations further comprise facilitating the device to use a reference symbol received power measurement value for beam management.

19. The non-transitory machine-readable medium of claim 17, wherein the facilitating the device to measure the reference signal comprises facilitating the device to use a quasi-colocation assumption.

20. The non-transitory machine-readable medium of claim 17, wherein the operations further comprise facilitating the device to use a reference symbol received power measurement value for mobility management.

* * * * *